Sept. 4, 1928.   
J. ROBINSON   
1,682,936

AUTOMATIC TRAIN PIPE COUPLING

Original Filed Nov. 26, 1920   2 Sheets-Sheet 1

INVENTOR
Joseph Robinson,
BY Watson, Coit
Moore & Grindle
ATTORNEYS

Sept. 4, 1928. 1,682,936
J. ROBINSON
AUTOMATIC TRAIN PIPE COUPLING
Original Filed Nov. 26, 1920 2 Sheets-Sheet 2

INVENTOR
Joseph Robinson,
BY Watson, Coit,
Morse & Grindle,
ATTORNEYS.

Patented Sept. 4, 1928.

1,682,936

UNITED STATES PATENT OFFICE.

JOSEPH ROBINSON, OF NEW YORK, N. Y.

AUTOMATIC TRAIN-PIPE COUPLING.

Application filed November 26, 1920, Serial No. 426,534. Renewed November 12, 1925.

My invention relates to automatic train pipe couplings and has among its objects to provide a simple and improved support for such couplings in which the resistance to lateral movement of the coupling head is reduced to a minimum. An especial object of my invention is to provide means for adjusting the universal joint in the bracket whereby the distance between the coupling head and such joint may be varied. A further object is to provide a universal joint by which the supporting spring of my invention may be placed under compression. My improvement is simple in design, strong and compact and inexpensive of manufacture.

The above objects are attained by, and my improvement consists in, the combinations arrangements, and constructions hereinafter described, pointed out in the appended claims, and illustrated in the accompanying drawings in which—

Figures 1, 2:
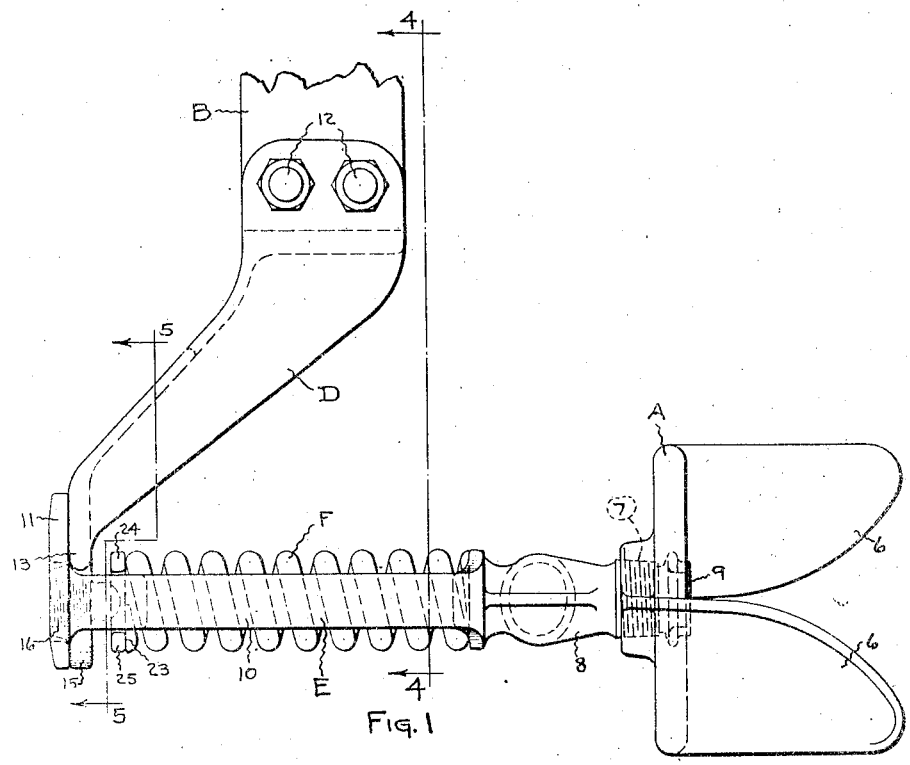
Figure 1 is a side elevation of my improvement.
Figure 2 is a plan view of my improvement showing in section certain parts of the universal joint. In this view the coupling head A is omitted.

Referring now to the drawings: Any suitable coupling head A may be carried by my improved support. I prefer a head of the type shown, having guiding wings 6 and a centrally disposed port or opening threaded as to 7 to threadingly receive the curved hollow fitting or conduit 8 of my improvement, and suitably carrying at its forward end in the plane of the face of the coupling head a gasket 9. A pair of spaced members or straps 10 lying preferably in the horizontal plane terminate at their forward end in the conduit 8 and at their rear end in a flange or projection 11, though they may of course be formed separately of the conduit and the flange if desired.

Suitably connected, as by bolts 12, to the usual lug B of the car coupler, I provide a bracket or base D the lower end of which viewed from the front or rear, has the general outline of a capital T, the cross or overhanging portions 13 and 14 of which form a boss or shoulder with which the members or straps 10 contact to prevent undue rotation of the conduit 8 and the members 10 about the longitudinal axis of the conduit. In this manner the proper positioning of the pipe or hollow body E, comprising the aforesaid conduit 8 and the members 10 and the flange 11, with respect to the bracket is efficiently effected, and inasmuch as the coupling head A is rigidly connected with the forward end of the conduit 8, it is also by the same means properly positioned with respect to the bracket. The vertically extending section 15 of the T shaped portion of the bracket, is provided with a threaded perforation 16 preferably disposed on the vertical centre of the bracket, shown particularly in Figures 2 and 5. As appears in Figures 1 and 5, the bracket D extends from above the members or straps 10 downwardly between such members, and the flange 11 is provided with a perforation 17 serving to receive a boss 18 formed on the rear face of the portion 15 of the bracket. At the rear of the conduit 8 and between the forward ends of the members 10 I provide an annular bearing 18', and into the threaded opening 16 of the bracket I adjustably mount as by threads, as shown, a pivot device 19 having a suitably shaped opening 20, Figure 3, formed therein to receive a wrench for adjusting the pivot device forward or backward in said device. The forward end of the pivot device is provided with a ball shaped or spherical portion 21 lying between the members 10 and preferably on the horizontal centre line thereof. This pivot device may be of any desired material, but I preferably construct it of a material having a different frictional coefficiency from that of the member or seat 22 pivotally mounted upon it. The member or seat 22 is provided with an annular bearing 23 for receiving a spring. This member or plate also lies between the members or straps 10 and is supported thereon by lugs or projections 24 and 25 which extend from the member or plate 22 and span the straps 10 as shown particularly in Figures 1 and 4. Between the plate 22 and upon the bearing 18 at the forward end of the straps 10, and the bearing 23 of the plate, is mounted a spiral buffer spring F which serves to extend and support the coupling head A forward of the bracket D with the flange 11 normally engaging the rear face of the bracket. It will be observed from the drawings that the spring is maintained in the proper position by the aforesaid bearings 18' and 23, and the lugs 24 and 25 engaging the straps 10, in cooperation with the ball and socket connection between the plate 22 and the pivot device 19. In this manner the several parts are maintained in their proper relative position, the ball and socket connection aforesaid serving to support the pipe or body E and the parts carried by it, on the bracket D.

The several parts of my invention are of course so proportioned as to permit of the proper assembly thereof. This may be readily accomplished by inserting the lower end of the bracket in position between the straps 10 and with its projection 18 extending into the opening 17 of the flange 11. The plate or member 22 is then placed upon the front face of the bracket and in alignment with the opening 16 therein. Following this the spring F is inserted whereupon the pivot device 19 is assembled into the bracket and screwed forward until the buffer spring F is under the initial compression necessary to draw the flange 11 into sufficiently rigid contact with the rear face of the bracket D as to maintain the coupling head A properly projected forward of the bracket and yieldingly supported in the normal horizontal position.

This construction produces a simple and efficient improved train pipe coupling support in which the coupling head A is supported for free universal movement relative to the bracket, the universal joint formed by the plate 22 and the pivot device 19 permitting of such movement and being adjustably mounted on the lower end of the bracket and constituting the means by which the spring F is placed under the required initial compression.

Figure 3:
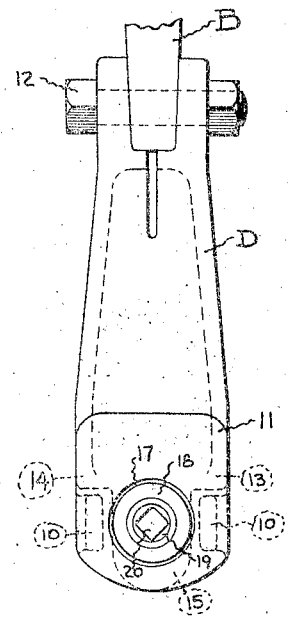
Figure 3 is a rear view of my improvement with the coupling head A omitted.
Figure 4:
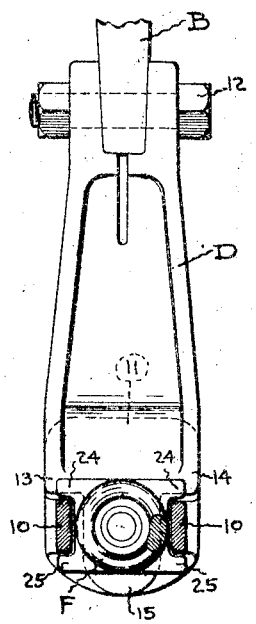
Figure 4 is a front view of the bracket and universal joint of my invention taken on the line 4—4 of Figure 1.
Figure 5:
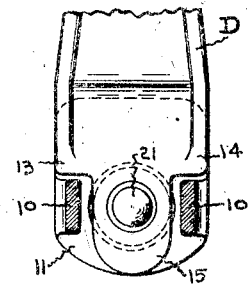
Figure 5 is a front view of the bracket and the pivot device of my invention taken on the line 5—5 of Figure 1.

Should it for any reason be desired to provide means, in addition to the connection between the members 19 and 22, for supporting the hollow body E on the bracket D, the same may be had by providing the lower end of the section 15 with latterally extending projections or lugs as shown at 9 and 10 in Figures 3 and 4 of my co-pending application for improvements in automatic train pipe connectors, filed December 2nd, 1919, and bearing Serial No. 341,887. With such a construction the hollow body E could not fall from the bracket in event the plate 22 should become broken.

What I claim is:

1. In an automatic train pipe coupling, the combination with a coupling head and a supporting bracket therefor, of a universal joint carried in front of the lower end of the bracket and adjustable longitudinally therein.

2. In an automatic train pipe coupling, the combination with a coupling head and a suitable supporting bracket therefor, of a spring for extending said head, arranged in front of said bracket, and a universal joint carried by said bracket and adjustable longitudinally therein to compress said spring.

3. In an automatic train pipe coupling, the combination with a coupling head and a suitable supporting bracket therefor having an opening in its lower end, of a spring to place the head under pressure, and a universal joint comprising ball and socket members one of which is mounted in the opening in said bracket for adjustment therein to compress said spring.

4. In an automatic train pipe coupling, the combination with a coupling head and a suitable supporting bracket therefor having an opening in its lower end, of a spring to place the head under pressure, and a universal joint comprising ball and socket members one of which is threadingly mounted in the opening in said bracket for adjustment therein to compress said spring.

5. In an automatic train pipe coupling, the combination of a coupling head, a bracket, spaced members secured to said head and extending rearward on opposite sides of said bracket, a flange secured to said members for engaging the rear face of the bracket, a pivot device rigidly mounted on said bracket intermediate the vertical sides thereof and adjustable toward and from said head, a plate arranged between said members and engaging said pivot device and also engaging said spaced members, and a coiled spring arranged between said members and bearing against said plate.

6. In an automatic train pipe coupling, in combination a bracket, a coupling head arranged in front of said bracket, a pivot device mounted on said bracket and adjustable toward and from said head, a pair of spaced members secured to said head and extending rearwardly past said bracket, a plate arranged between said members and engaging said pivot device, and a coiled spring arranged between said members and positioned between said pivot device and said head.

7. In an automatic train pipe coupling, a bracket having a pivot device rigidly and adjustably secured thereto and extending forwardly beyond the front face thereof, and the front end of said pivot device having a rounded surface, a plate engaging the rounded surface of said pivot device, a coupling head, supporting means connected to said head and engaging the rear face of said bracket, and a coiled spring for normally maintaining said plate in engagement with said pivot device and said supporting means in engagement with the rear face of said bracket.

8. In an automatic pipe coupling, a bracket, a coupling head arranged in front of said bracket, a pivot device rigidly secured to said bracket and adjustable therein toward and from said head, a plate engaging said pivot device, a hollow body connected to said head and extending rearwardly of said bracket and engaging the rear face thereof, and a coiled spring for maintaining said plate in engagement with said pivot device and the said hollow body in engagement with the rear face of the bracket.

9. In an automatic train pipe coupling, the combination of a coupling head, a bracket, spaced members secured to said head and extending rearwardly on opposite sides of said bracket, a flange secured to said members for engaging the rear face of the bracket, an adjustable pivot device rigidly mounted on said bracket, a seat bearing against said pivot device and universally movable relative thereto, a coiled spring arranged between said spaced members and bearing at one end against said seat and serving to support said coupling head in front of said bracket.

10. In an automatic train pipe coupling, in combination, a bracket, a coupling head arranged in front of said bracket, a pivot device mounted on said bracket and adjustable toward and from said head, a pair of spaced members secured to said head and extending rearwardly past said bracket, a spring seat arranged between said members and engaging said pivot device, and a coiled spring arranged between said members and positioned between said seat and said head.

11. In an automatic train pipe coupling, the combination of a coupling head, a bracket having a portion adjustably attached to its front face and provided with a curved surface, spaced members secured to said head and extending rearwardly on opposite sides of said bracket, a flange secured to said members for engaging the rear face of the bracket, a seat bearing against said curved surface and universally movable relative thereto, and a coiled spring arranged between said seat and said head and serving to support said head in front of said bracket.

12. In an automatic train pipe coupling, a bracket, a coupling head, a member extending from said head rearwardly and spanning said bracket, said bracket having a portion adjustably mounted on its lower end provided with a curved seat, a movable seat adapted to engage said first mentioned seat, said movable seat being arranged within said member in front of said bracket and engaging said first mentioned seat and a spring arranged between said movable seat and said head for yieldingly projecting the head in front of the bracket.

In testimony whereof I hereby affix my signature.

JOSEPH ROBINSON.